(12) United States Patent
Zhu

(10) Patent No.: US 8,000,116 B2
(45) Date of Patent: Aug. 16, 2011

(54) OUTPUT PROTECTION CIRCUIT OF A POWER CONVERTER

(75) Inventor: Ruiping Zhu, Guangzhou (CN)

(73) Assignee: Mornsun Guangzhou Science & Technology Ltd., Guangdong (CN)

( * ) Notice: Subject to any disclaimer, the term of this patent is extended or adjusted under 35 U.S.C. 154(b) by 190 days.

(21) Appl. No.: 12/516,202

(22) PCT Filed: Mar. 10, 2008

(86) PCT No.: PCT/CN2008/000473
§ 371 (c)(1),
(2), (4) Date: May 25, 2009

(87) PCT Pub. No.: WO2008/122189
PCT Pub. Date: Oct. 16, 2008

(65) Prior Publication Data
US 2010/0054003 A1    Mar. 4, 2010

(30) Foreign Application Priority Data

Apr. 6, 2007 (CN) .......................... 2007 1 0027460

(51) Int. Cl.
*H02H 7/122* (2006.01)

(52) U.S. Cl. ................ 363/50; 363/52; 363/53; 363/84; 363/89

(58) Field of Classification Search ................... 363/50, 363/52, 53, 84, 89
See application file for complete search history.

(56) References Cited

U.S. PATENT DOCUMENTS

| | | | | |
|---|---|---|---|---|
| 3,808,503 A * | 4/1974 | Hentschel | ....................... | 361/30 |
| 3,961,239 A * | 6/1976 | Lach | ............................. | 324/384 |
| 7,042,200 B2 * | 5/2006 | Chen et al. | ..................... | 323/283 |
| 7,103,394 B2 * | 9/2006 | Morphy | ..................... | 455/569.1 |
| 7,135,845 B2 * | 11/2006 | Zverev et al. | ................. | 323/284 |
| 2004/0196013 A1 * | 10/2004 | Chen et al. | ..................... | 323/282 |
| 2005/0013076 A1 * | 1/2005 | Zverev et al. | ..................... | 361/90 |

* cited by examiner

*Primary Examiner* — Bao Q Vu
(74) *Attorney, Agent, or Firm* — George G. Wang; Bei & Ocean

(57) ABSTRACT

An output protection circuit used for a power converter having an operational amplifier, a diode, a number of voltage-dividing resistors, and a switch tube. In this circuit, the voltage-dividing resistors are connected in series to form a voltage-dividing network, of which one node is connected to a reference level end Vref of a PWM control module of the converter, while the other node is grounded. A voltage dividing point M is coupled to an inverting input end of the operational amplifier AR1.

5 Claims, 5 Drawing Sheets

OUTPUT PROTECTION CIRCUIT OF A POWER CONVERTER

FIELD OF THE INVENTION

The invention relates to a protection circuit and, more particularly relates to an output protection circuit used for a power converter.

BACKGROUND OF THE INVENTION

Presently, most users expect power converters with multiple protection functions, low cost, high density and high reliability, which will meet needs of users. Protection functions include such as prevention of input under-voltage, input over-voltage, over-temperature, output over-voltage and output over-current (short circuit) and the like. The most point concerned by a user is output over-voltage protection and output over-current protection (i.e., short circuit protection), both of which have mostly significant influence on final user. It will bring great loss to final users in case that these two protection functions fail to work. Nowadays, almost all output over-voltage protection mechanisms employ optical coupling control. As a result, this will not only increase cost, but also result in destruction of power or device in case that feedback optical coupling and over-voltage protection optical coupling work abnormally during test process or used by a user. Among power failures, optical coupling failure has the most likelihood to occur.

1. Output over-voltage protection: A load will be protected if over-voltage occurs at the output end, and by now the following protection types are often taken:

1) Locking type in which a module will be locked if over-voltage occurs at the output end, and in this situation, the output end will not work until power is restarted (sometimes restart will be enabled only after the internal capacitor of the power is completely discharged). This type of protection is inconvenient for users.

2) Voltage restriction type in which the output voltage will not increase any more when the output value reaches a certain value and the output voltage will be locked at a certain value; and resumption will be possible after malfunction is eliminated.

These two kinds of protection both employ dual optical coupling feedback by far and the failure rate of optical coupling is high. When optical coupling of feedback and over-voltage is in failure, the loop will become open, thereby causing the loop out of control and over-voltage losing its function and accordingly, post-devices will subject to vital destruction.

2. Output over-current protection: The power or load will be protected if short circuit or over-load at the output end occurs. The following protection types are frequently utilized:

1) Rated current droop type: This type of protection is widely used in RCC circuit due to characteristics of circuit itself.

By now this type of protection is mostly used in rechargers and the like. However, it is difficult to maintain uniformity during production process and hard to control the process. Moreover, power improvement is also difficult, and reliability is poor, thus this type of protection has its main application in low end users.

2) Current constant type: The control circuit will start when the output current reaches a certain value such that the circuit will enter into protection state.

This type of protection is the best in quality in that protection will functions when the output current becomes a certain value, and hiccup mode (or lock type) will be resumed automatically after cancellation of protection. Current stress resulted during output rectification process will be very small. This mode is extensively used by now, however, to make full use of this mode, and make the input current be extremely small after occurrence of short circuit, additional relevant circuit should be added to keep continuous short circuit or over-current.

3) Power constant type: Generally, the output power is limited at the primary side. As the output current increases, the output voltage will decrease.

This mode operates according to self-protection characteristics of the chip. However, this mode will produce large input and output current when short circuit or over-current presents, thereby resulting in serious current stress for primary MOS and rectifier. In this case, the duty ration will reach the highest limit. Therefore, this mode normally provides no over-current and short circuit protection, and it is almost impossible to maintain continuous short circuit and short circuit time should be very short.

FIG. 1 illustrates voltage-current characteristics chart of the output of the three types of over-current protection in which (1) represents rated current droop type, (2) represents current constant type, while (3) represents power constant type. Among these types, the protection effect of the first and second types is better, while that of the last one is worst.

A block diagram of a conventional power converter is shown in FIG. 2. The input power is subject to filter module at first so as to filter out external noise signal and obtain pure power. Next, the power enters into power conversion module which determines energy outputted and has function of delivery and transform as the vital part of the switch power. Then, the power enters into rectification and filter module which eliminates noise signal generated by power conversion module or the like. Finally, the power enters into output module and then is supplied to the user. PWM control module controls the entire power to maintain output is always present. Output sampling and feedback module serves to monitor and feedback so as to communicate information. Output sampling and feedback module feeds the monitored information back to the PWM control module, and then the PWM control module controls power conversion to secure stable output of values. The auxiliary power is power supplied to the PWM control module.

SUMMARY OF THE INVENTION

One object of the present invention is to provide an output protection circuit used for a power converter, which can produce predetermined value when over-current or shot circuit occurs and provide high reliability with low consumption.

To obtain the above object, an output protection circuit used for a power converter is provided. Said protection circuit includes an operational amplifier, a diode, a plurality of voltage-dividing resistors and a switch tube. The voltage-dividing resistors R3 and R4 are connected in series to form a voltage-dividing network, wherein one node of the network is connected to a reference level end Vref of a PWM control module of the converter, while the other node is grounded. A voltage dividing point M is coupled to an inverting input end of the operational amplifier AR1. The voltage dividing resistors R1 and R2 are connected with each other such that a voltage dividing network is defined, wherein one node of the network is coupled to a compensation level end Comp of the PWM control module via the diode D1 with a inversed configuration, while the other node is grounded. One node of a voltage point N is connected with a non-inverting input end of the operational amplifier AR1, while the other node is connected to an output end of the operational amplifier AR1 through a capacitor C1. An inverting input end of the operational amplifier AR1 is coupled to a reference level end Vref of the PWM control module, and the output end thereof is connected to the switch diode via the resistor R5 and then go back to the compensation level end Comp.

The switch tube described in the invention is a transistor of NPN-type. One node of the base of the transistor is connected to the voltage dividing resistor R6 which then is grounded, while the other node is connected to the resistor R5. The emitter of the transistor of NPN-type is grounded, while the collector thereof is coupled to the compensation level end Comp of the PWM control module.

The switch tube described in the invention is a transistor of PNP-type. One node of the base of the transistor is connected to the voltage dividing resistor R6 which then is grounded, while the other node is connected to the resistor R5. The collector of the transistor of PNP-type is grounded, while the emitter thereof is coupled to the compensation level end Comp of the PWM control module.

The switch tube described in the invention may be a FET (field effect transistor). One node of the gate terminal of the FET is connected to the voltage dividing resistor R6 which then is grounded, while the other node is connected to the resistor R5. The drain terminal of the FET is grounded, while the source terminal thereof is coupled to the compensation level end Comp of the PWM control module.

The protection circuit discussed in the invention also includes a TVS diode suppressing circuit for providing over-voltage protection for the power output. The TVS diode suppressing circuit mainly consists of a transient voltage suppressing diode which is inversely connected to positive and negative electrodes of the load output. The transient voltage suppressing diode cooperates with the protection circuit connected with the PWM control module to obtain over voltage protection.

By using the invention, over current or over voltage protection of hiccup mode can be reached:

(1) Over current or short circuit protection of hiccup mode: Predetermined value can be obtained, self-resumption and persistent short circuit are possible, and high reliability can be realized with extremely low consumption.

(2) Over-voltage protection of hiccup mode: Predetermined value can be achieved, high reliability can be ensured, continuous over-voltage is permitted, cost is very low and no optical coupling control is required. In addition, this protection is not controlled by the secondary side, thereby reducing problems caused by failure of optical coupling.

DETAILED DESCRIPTION OF THE INVENTION

Figure 1:
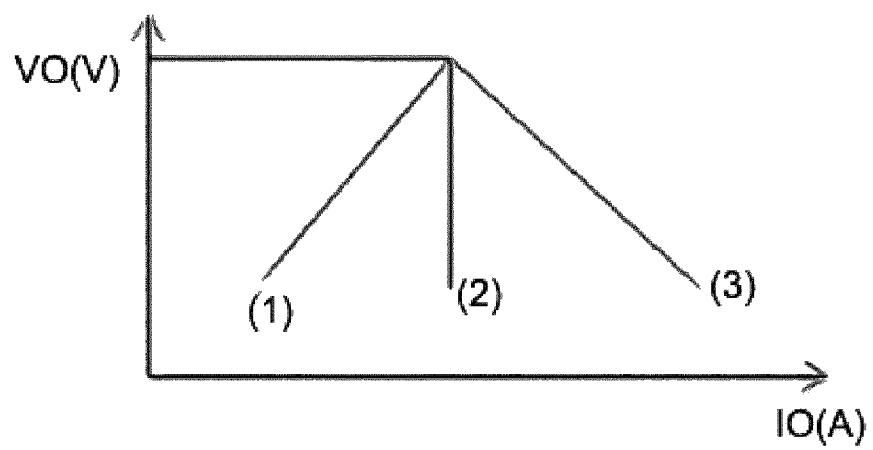
FIG. 1 shows an output voltage-current characteristics diagram of three kinds of over-current protection.
Figure 2:
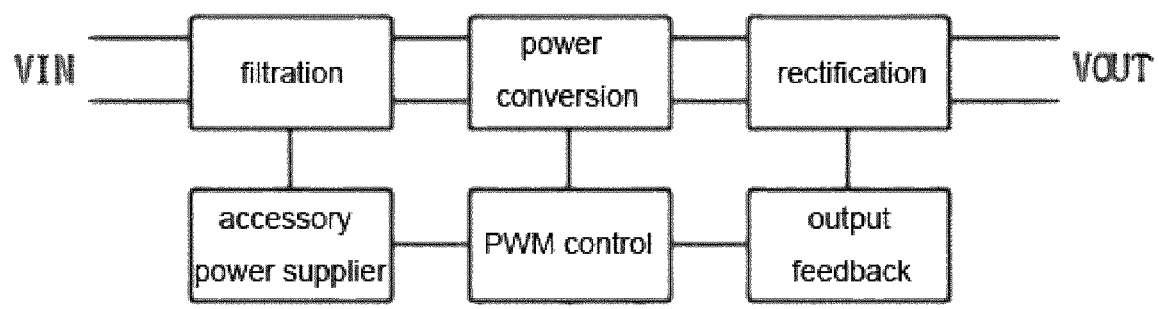
FIG. 2 shows principle configuration block diagram of a conventional power converter.
Figure 3:
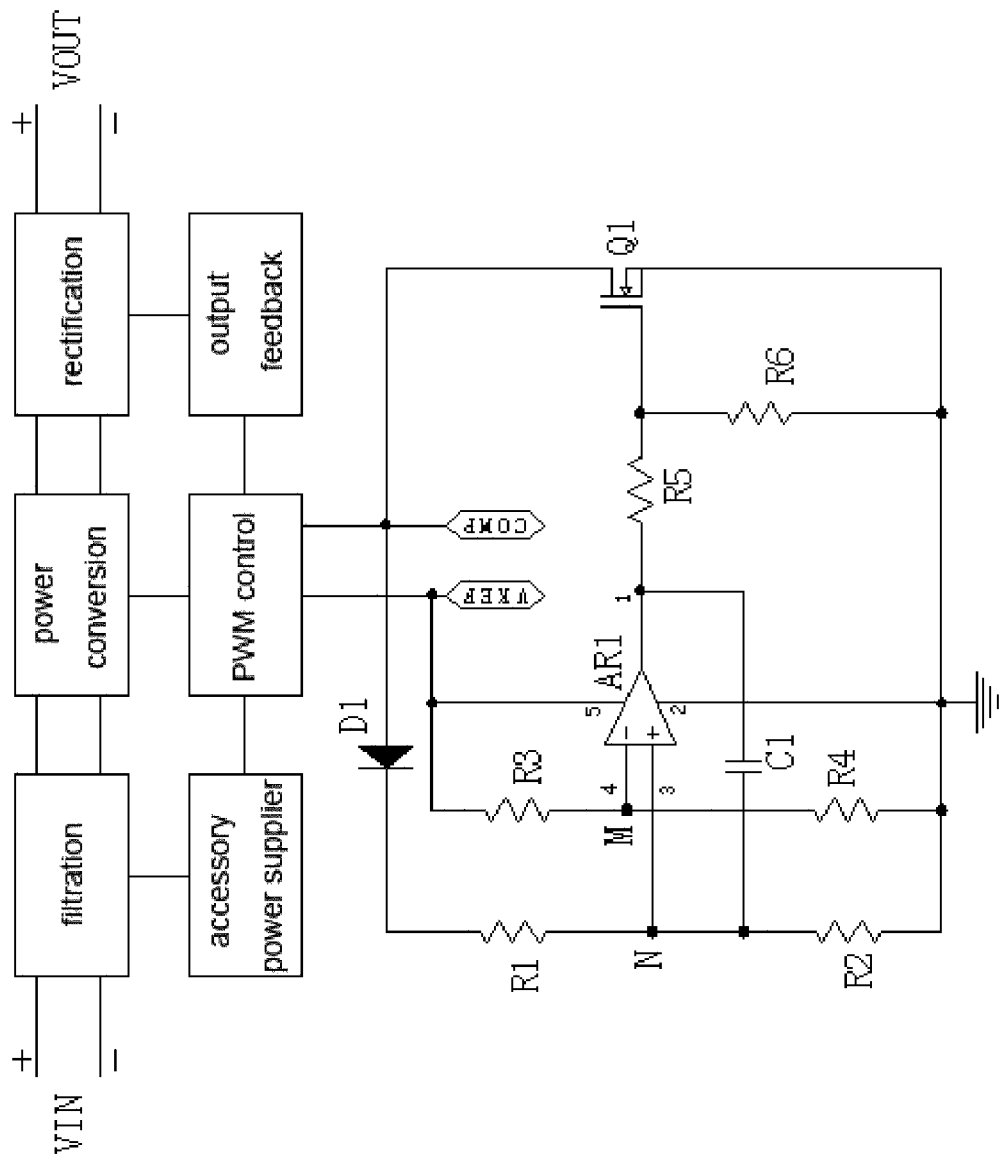
FIG. 3 shows the schematic circuit diagram of a protection circuit according to one embodiment of the invention.

FIG. 3 shows a schematic circuit diagram of a protection circuit according to one embodiment of the invention. As shown, the protection circuit connected with a PWM control module of a power converter, includes an operational amplifier AR1, a diode D1, a plurality of voltage-dividing resistors (R1, R2, R3 and R4, 译者加) and a field effect transistor (FET) Q1. The voltage-dividing resistors R3 and R4 are connected in series to form a voltage-dividing network, wherein one node of the network is connected to a reference level end Vref of the PWM control module of the converter, while the other node is grounded. A voltage dividing point M is coupled to an inverting input end of the operational amplifier AR1. The voltage dividing resistors R1 and R2 are connected with each other such that a voltage dividing network is defined, wherein one node of the network is coupled to a compensation level end Comp of the PWM control module via the diode D1 with a inversed configuration, while the other node is grounded. One node of a voltage point N is connected with a non-inverting input end of the operational amplifier AR1, while the other node is connected to an output end of the operational amplifier AR1 through a capacitor C1. An inverting input end of the operational amplifier AR1 is coupled to a reference level end Vref of the PWM control module and the output end thereof is connected to the gate of the FET Q1 via the resistor R5, while the gate is also connected to a voltage dividing resistor R6 which then is grounded. The drain of the FET Q1 is also grounded, while the source thereof is connected to the compensation level end Comp of the PWM control module.

Working power of the operational amplifier AR1 is provided by the reference level end of the PWM control module. The inverting input end of the operational amplifier AR1 is used as reference and provided by the reference level end of the PWM control module, while the non-inverting input end of the operational amplifier AR1 is provided by the Comp end of the PWM control module. Compensation level at the Comp end of the PWM control module will rise when over-current or short circuit presents, and accordingly, Level at the non-inverting input end of the operational amplifier AR1 will also rise. When a predetermined value is reached, the reference voltage at the non-inverting input end will become higher than that at the inverting input end of the operational amplifier AR1, thereby causing reversal of the operational amplifier AR1. Resistance of the resistors R1, R2, R3 and R4 can be adjusted to a predetermined value so as to obtain desired level during over-current protection. At this time, high level will be outputted from the output end of the operational amplifier AR1 such that the FET Q1 conducts and high level of the Comp end of the PWM control module will be cut off, thereby making the power changed into protection state. The compensation level of the Comp end of the PWM control module will be low level when protection works. The power will be restarted if the input power still operates or failures still exist. Conduction and cutoff period will be kept for a long time. This type of protection is called protection of hiccup mode with constant current. Hiccup period is the sum of the conduction period and cutoff period, and conduction time is determined by resistors R1, R2 and capacitor C1. When reducing the magnitude of the capacitor C1 or resistors R2, the capacitor C16 will discharge through the resistors R2, and accordingly, the hiccup period will also be shortened. When reducing value of the resistors R1, the conduction time will also be reduced. The diode D1 serves not only to prevent discharge of the capacitor C1 via the resistors R1 and Comp end, but also to prevent improper operation, thus facilitating obtaining protection of hiccup mode.

Figure 4:
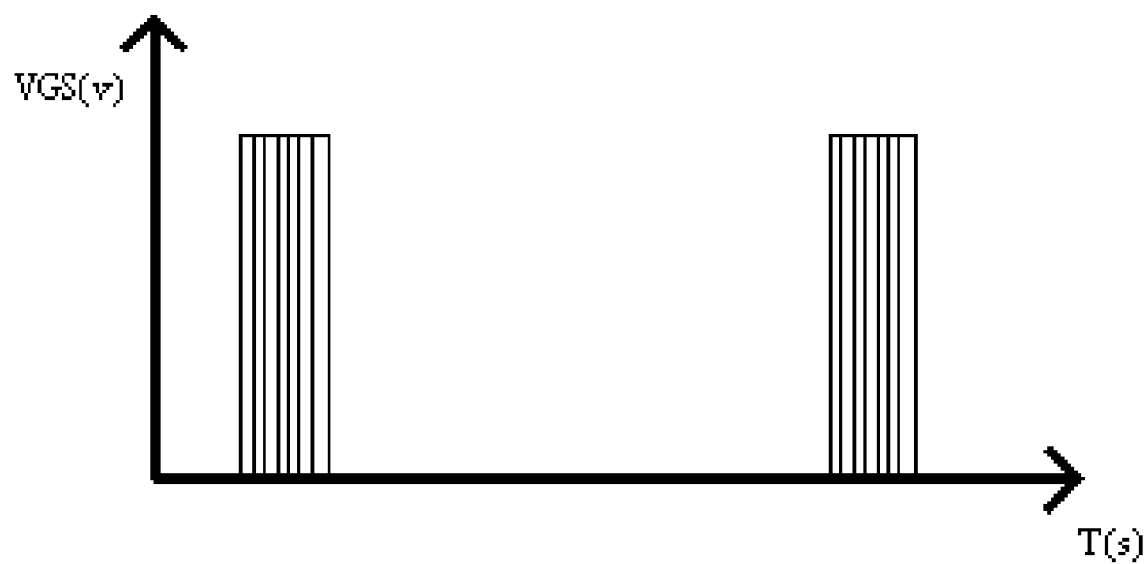
FIG. 4 shows a schematic VGS waveform diagram of a primary MOS when over-current or short circuit happens.

FIG. 4 shows a schematic VGS waveform diagram of a primary MOS when over-current or short circuit happens. In case that over-current or short circuit at the output end comes, the drive signal VGS of the FET will become intermittent. This intermittent repetition period can be set manually, thereby maintaining low consumption during over-current or short circuit, and resumption can be enabled after troubleshooting.

The FET discussed in above embodiment may be replaced by a transistor of NPN-type. One node of the base of the transistor is connected to the voltage dividing resistor R6 which then is grounded, while the other node is connected to the resistor R5. The emitter is grounded, while the collector is coupled to the compensation level end Comp of the PWM control module. Replacement with a transistor of PNP-type is also possible. One node of the base of the transistor is connected to the voltage dividing resistor R6 which then is grounded, while the other node is connected to the resistor R5. The collector of the transistor of PNP-type is grounded, while the emitter thereof is coupled to the compensation level end Comp of the PWM control module. In this case, the same effect can also be obtained.

Figure 5:
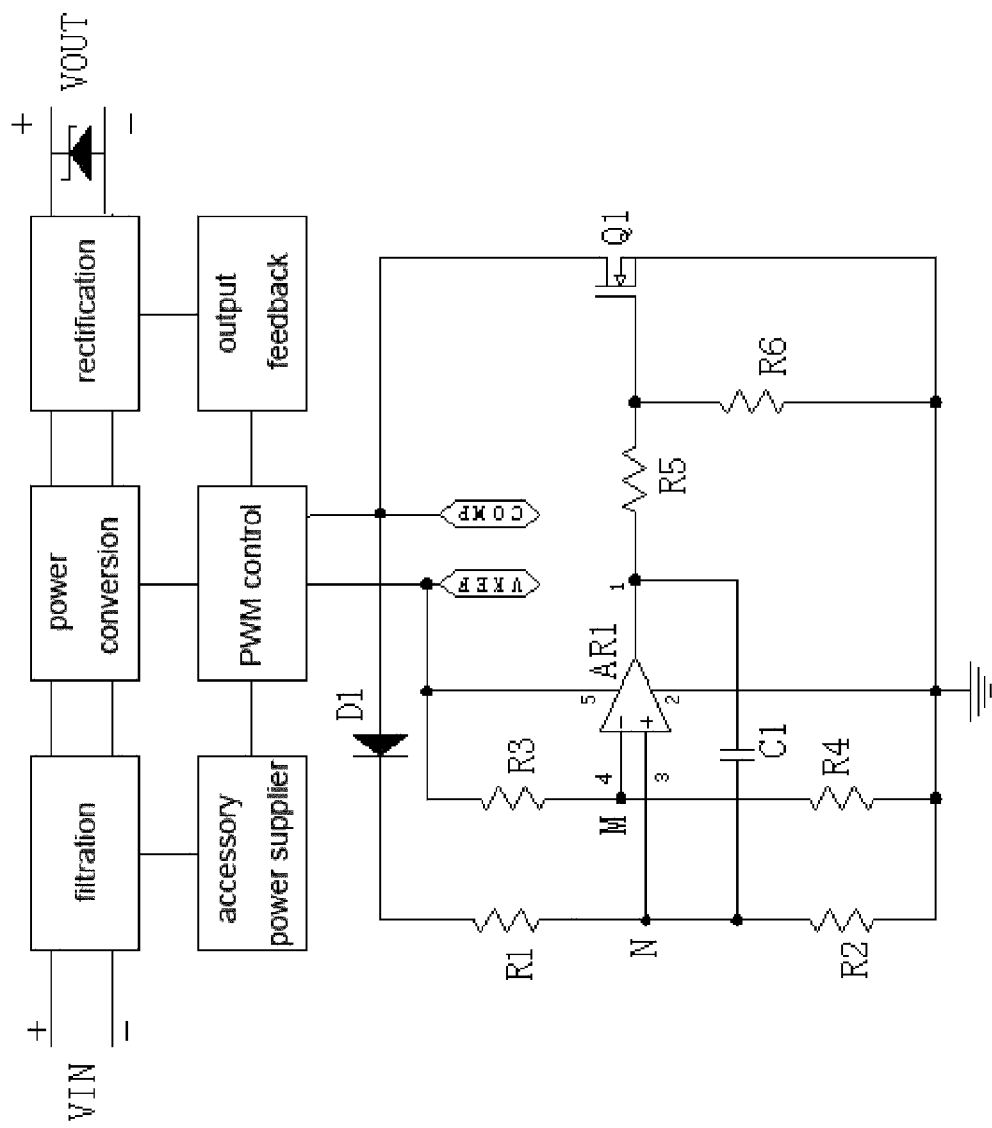
FIG. 5 shows a schematic circuit diagram of a protection circuit according to another embodiment of the invention.

FIG. 5 shows a schematic circuit diagram of a protection circuit according to another embodiment of the invention. Compared with the first embodiment described above, the difference is that a TVS diode suppressing circuit for providing over-voltage protection for the power output is added. The TVS diode suppressing circuit consists of a transient voltage suppressing diode which is inversely connected to positive and negative electrodes of the load output.

When over-voltage occurs at the output end, the transient voltage suppressing diode will limit the voltage to a predetermined value, over-current state will come. In this case, the output over-current protection will function such that the output voltage will be restricted to a value. The output will be kept in hiccup mode before output over-voltage failure disappeared.

Figure 6:
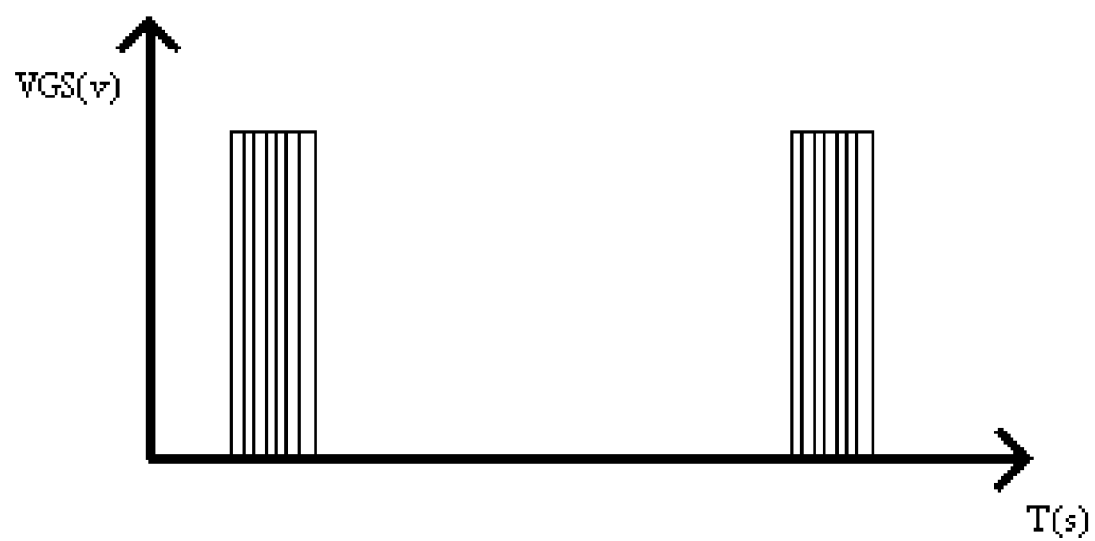
FIG. 6 shows output voltage waveform diagram and VGS waveform diagram of the primary MOS when over-voltage occurs.
Figure 6:
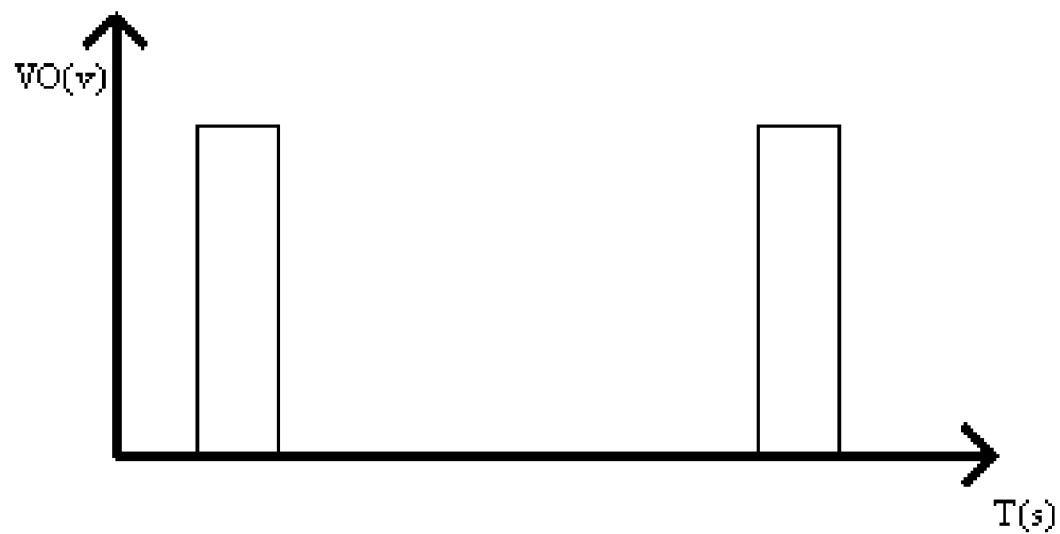

FIG. 6 shows output voltage waveform diagram and VGS waveform diagram of the primary MOS when over-voltage occurs. In case that over-voltage at the output end comes, the drive signal VGS of the FET will become intermittent. This intermittent repetition period can be set manually. The output enters into hiccup mode, and the period is the same as the drive signal VGS. The voltage outputted will be restricted to a value and resumption can be enabled after troubleshooting.

What is claimed is:

1. An output protection circuit used for a power converter comprising:
    an operational amplifier;
    a diode;
    a plurality of voltage-dividing resistors; and
    a switch tube;
    wherein the voltage-dividing resistors R3 and R4 are connected in series to form a voltage-dividing network, wherein one node of the network is connected to a reference level end Vref of a PWM control module of the converter, while the other node is grounded;
    a voltage dividing point M is coupled to an inverting input end of the operational amplifier AR1;
    the voltage dividing resistors R1 and R2 are connected with each other such that a voltage dividing network is defined, wherein one node of the network is coupled to a compensation level end Comp of said PWM control module via the diode D with a inversed configuration, while the other node is grounded;
    One node of a voltage point N is connected with a non-inverting input end of the operational amplifier AR1, while the other node is connected to an output end of the operational amplifier AR1 through a capacitor C1;
    An inverting input end of the operational amplifier AR1 is coupled to a reference level end Vref of the PWM control module, and the output end thereof is connected to the switch diode via the resistor R5 and then go back to the compensation level end Comp.

2. The output protection circuit according to claim 1, wherein said switch tube is a transistor of NPN-type, one node of the base of the transistor being connected to the voltage dividing resistor R6 which then is grounded, the other node being connected to the resistor R5; the emitter of said transistor of NPN-type is grounded, while the collector thereof is coupled to the compensation level end Comp of the PWM control module.

3. The output protection circuit according to claim 1, wherein said switch tube is a transistor of PNP-type; one node of the base of the transistor is connected to the voltage dividing resistor R6 which then is grounded, while the other node is connected to the resistor R5; and said collector of the transistor of PNP-type is grounded, while the emitter thereof is coupled to the compensation level end Comp of the PWM control module.

4. The output protection circuit according to claim 1, wherein said switch tube is a FET; one node of the gate terminal of the FET is connected to the voltage dividing resistor R6 which then is grounded, while the other node is connected to the resistor R5; the drain terminal of the FET is grounded, while the source terminal thereof is coupled to the compensation level end Comp of the PWM control module.

5. The output protection circuit according to claim 1, wherein said protection circuit also includes a TVS diode suppressing circuit for providing over-voltage protection for the power output; the TVS diode suppressing circuit is constructed of a transient voltage suppressing diode which is inversely connected to positive and negative electrodes of the load output.

* * * * *